UNITED STATES PATENT OFFICE.

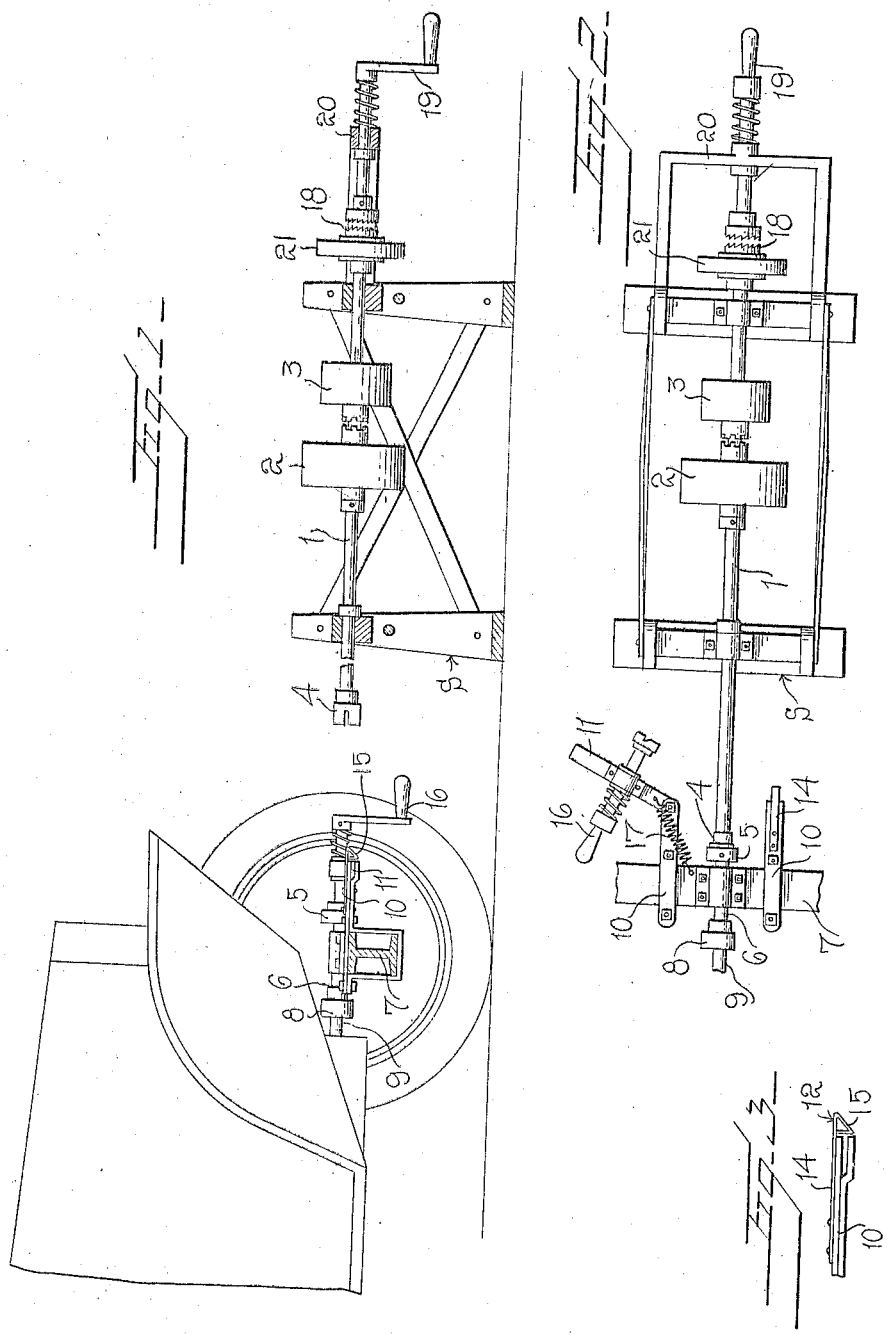

FRANK W. FORE, OF BELPRE, OHIO.

POWER-TRANSMITTING DEVICE.

1,301,548.  Specification of Letters Patent.  Patented Apr. 22, 1919.

Application filed May 15, 1918. Serial No. 234,629.

*To all whom it may concern:*

Be it known that I, FRANK W. FORE, a citizen of the United States, residing at Belpre, in the county of Washington and State of Ohio, have invented certain new and useful Improvements in Power-Transmitting Devices, of which the following is a specification, reference being had to the accompanying drawings.

This invention relates to certain improvements in power transmitting devices and is an improvement of the embodiment of my invention as set forth in my co-pending application, Serial No. 215,636, filed February 6, 1918, and it is an object of the invention to provide novel and improved means whereby the crank coacting directly with the crank shaft of an internal combustion engine may be readily thrown into an inoperative position, together with means whereby the crank may be held in working position.

The invention also has for an object to provide a novel and improved transmitting device including a rotatably supported shaft adapted to have an end portion thereof coupled with the crank shaft of an internal combustion engine together with a grinding element carried by the first named shaft so that the device may be employed with convenience and facility in the sharpening of tools or similar work.

The invention consists in the details of construction and in the combination and arrangement of the several parts of my improved power transmitting device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in side elevation and partly in section illustrating a power transmitting device constructed in accordance with an embodiment of my invention;

Fig. 2 is a fragmentary view in top plan of the device as disclosed in Fig. 1 with the transmission device coupled to the crank shaft of the motor; and Fig. 3 is a fragmentary view in side elevation illustrating in detail the latch for holding the swinging support or arm for the crank in working position.

As disclosed in the accompanying drawings S denotes a supporting structure adapted to be rested upon the ground or other surface. Rotatably mounted upon the structure S is a mandrel or shaft 1 and said shaft 1 has mounted thereon the pulleys 2 and 3 of different diameters. The larger pulley 2 is loosely mounted upon the shaft 1, while the pulley 3 is mounted for sliding movement on said shaft 1 but keyed thereto to rotate therewith. The smaller pulley 3 is adapted to be moved longitudinally of the shaft 1 manually or by direct contact with the hand so that the same may be interlocked with the larger pulley 2 when it is desired to operate a driven element from said larger pulley.

One end portion of the shaft 1 has affixed thereto a clutch or coupling member 4 adapted to interlock with the clutch or coupling member 5 carried by an end portion of the supplemental or extension shaft 6. The supplemental or extension shaft 6 is rotatably supported by the forward transverse beam 7 of an automobile frame and is suitably coupled as at 8 with the outer end portion of the crank shaft 9.

The beam 7 at each side of the shaft 6 is provided with a pair of forwardly directed and vertically spaced arms 10 and pivotally engaged between the outer end portions of one of the pairs of arms 10 is an end portion of the arm 11. The opposite end portion of the arm 11 is adapted to be swung between the outer end portions of the second pair of arms 10 and held therebetween by the latch 12. The latch 12 comprises a spring arm 14 disposed longitudinally of the arms 10 and overlying the outermost of said pair of arms and secured at its inner end thereto. The forward end of the arm 14 terminates in advance of the free ends of the arms 10 and is provided with the depending extension or lip 15 which serves to hold the arm 11 against outward swinging movement until the forward or free end of the spring arm 14 is raised sufficiently to elevate the depending extension or lip 15 above the arm 11. The forward face of the lip or extension 15 is downwardly and inwardly beveled so that when the arm 11 is swung inwardly the same may readily pass beneath the extension or lip 15 and enter between the outer end portions of the adjacent pair of arms 10.

Rotatably supported by the arm 11 is a crank 16 adapted to coact directly with the supplemental shaft 6 when the automobile is adapted for road use.

To facilitate the inward swinging movement of the arm 11 I find it of advantage to provide the retractile member 17 anchored at one end to the beam 7 and coacting with the arm 1 to constantly urge the same inwardly. The retractile member 17 as herein disclosed is a conventional coil spring, and serves to maintain the arm in its transverse or working position especially when the automobile is traveling.

The end portion of the shaft 1 remote from the coupling member 4 is provided with a clutch member 18 with which is adapted to coact the crank 19 of a conventional type and which is rotatably supported by the frame 20 extending outwardly from the adjacent end portion of the supporting structure S.

I also find it of advantage to suitably affix to the shaft 1 immediately adjacent the clutch member 18 an emery wheel 21 so that a convenient means may be provided for grinding tools or similar work.

From the foregoing description, it is thought to be obvious that a power transmitting device constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a motor driven vehicle and the crank shaft of an internal combustion engine carried thereby, a swinging arm engaged with the body of the vehicle, and a crank carried by the arm for coaction with the crank shaft.

2. In combination with a motor driven vehicle and the crank shaft of an internal combustion engine carried thereby, a swinging arm engaged with the body of the vehicle, a crank carried by the arm for coaction with the crank shaft, and means coacting with the arm for holding the crank in working position.

3. In combination with a motor driven vehicle and the crank shaft of an internal combustion engine carried thereby, a swinging arm engaged with the body of the vehicle, a crank carried by the arm for coaction with the crank shaft, and means for constantly urging the arm in one direction.

4. In combination with a motor driven vehicle and the crank shaft of an internal combustion engine carried thereby, a swinging arm engaged with the body of the vehicle, a crank carried by the arm for coaction with the crank shaft, and a spring latch carried by the body of the vehicle and coacting with the arm for holding the same in working position.

5. In combination with a motor driven vehicle and the crank shaft of an internal combustion engine carried thereby, a swinging arm engaged with the body of the vehicle, a crank carried by the arm for coaction with the crank shaft, and a retractile member coacting with the body of the vehicle and the arm for constantly urging the arm in one direction.

In testimony whereof I hereunto affix my signature in the presence of two witnesses.

FRANK W. FORE.

Witnesses:
 HELEN WATERMAN,
 JOHN SWAN.

Copies of this patent may be obtained for five cents each, by addressing the "Commissioner of Patents, Washington, D. C."